(12) United States Patent
Kallehbasti

(10) Patent No.: US 12,291,960 B2
(45) Date of Patent: May 6, 2025

(54) SEALING DETECTION DURING FORMATION PRESSURE TESTING

(71) Applicant: Halliburton Energy Services, Inc., Houston, TX (US)

(72) Inventor: Mehdi Ali Pour Kallehbasti, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 18/127,845

(22) Filed: Mar. 29, 2023

(65) Prior Publication Data

US 2024/0328307 A1  Oct. 3, 2024

(51) Int. Cl.
*E21B 47/117* (2012.01)
*E21B 49/08* (2006.01)
*G01M 3/26* (2006.01)

(52) U.S. Cl.
CPC .......... *E21B 47/117* (2020.05); *E21B 49/087* (2013.01); *G01M 3/26* (2013.01)

(58) Field of Classification Search
CPC ....... E21B 47/117; E21B 49/087; G01M 3/26
See application file for complete search history.

(56) References Cited

U.S. PATENT DOCUMENTS

| | | | | |
|---|---|---|---|---|
| 5,233,866 | A * | 8/1993 | Desbrandes | E21B 49/10 73/152.52 |
| 6,932,167 | B2 * | 8/2005 | Proett | E21B 49/008 702/7 |
| 7,395,703 | B2 * | 7/2008 | Niemeyer | E21B 49/008 73/152.24 |
| 8,555,966 | B2 | 10/2013 | Maxit et al. | |
| 8,839,668 | B2 * | 9/2014 | Hemsing | E21B 49/008 73/152.27 |
| 9,771,797 | B2 * | 9/2017 | Hemsing | E21B 49/008 |
| 10,550,687 | B2 | 2/2020 | Betancourt et al. | |
| 2004/0011525 | A1 | 1/2004 | Jones et al. | |
| 2004/0026125 | A1 | 2/2004 | Meister et al. | |

(Continued)

OTHER PUBLICATIONS

International Search Report & Written Opinion; PCT Application No. PCT/US2023/016844; mailed Dec. 18, 2023.

*Primary Examiner* — Steven A MacDonald
(74) *Attorney, Agent, or Firm* — NOVAK DRUCE CARROLL LLP

(57) ABSTRACT

Systems and techniques are provided for determining an integrity of a seal between a formation tester and a formation during formation testing. An example method can include controlling placement of a probe of a formation tester from a wellbore and into a formation as part of a formation measurement operation performed by the formation tester in the formation; gathering first pressure measurements through a probe during a probe setting phase of the formation measurement operation; gathering second pressure measurements through the probe during a phase of the formation measurement operation after the probe setting phase; and determining an integrity of a seal between a packer of the formation tester and the formation based on a comparison of the first pressure measurements gathered during the probe setting phase and the second pressure measurements gathered during the phase of the formation measurement operation after the probe setting phase.

17 Claims, 16 Drawing Sheets

(56) References Cited

U.S. PATENT DOCUMENTS

| | | | |
|---|---|---|---|
| 2004/0050153 A1 | 3/2004 | Krueger et al. | |
| 2004/0055745 A1* | 3/2004 | Georgi | E21B 49/087 166/113 |
| 2004/0231841 A1* | 11/2004 | Niemeyer | E21B 49/008 166/264 |
| 2009/0020284 A1* | 1/2009 | Graf | E21B 44/00 166/250.15 |
| 2009/0283265 A1* | 11/2009 | Maxit | E21B 49/0875 166/69 |
| 2012/0316788 A1 | 12/2012 | Bedouet et al. | |
| 2013/0019672 A1* | 1/2013 | Hemsing | E21B 49/088 73/152.51 |
| 2014/0360258 A1* | 12/2014 | Hemsing | E21B 47/06 73/152.51 |
| 2015/0114714 A1* | 4/2015 | Dahl | E21B 49/005 175/40 |
| 2016/0281494 A1* | 9/2016 | Shirdel | E21B 33/12 |
| 2022/0381098 A1 | 12/2022 | Yang et al. | |

* cited by examiner

SEALING DETECTION DURING FORMATION PRESSURE TESTING

TECHNICAL FIELD

The present disclosure generally relates to testing of geological formations, and more particularly to determining an integrity of a seal between a formation tester and a formation during formation testing.

BACKGROUND

During the drilling and completion of oil and gas wells, it may be necessary to engage in ancillary operations, such as monitoring the operability of equipment used during the drilling process or evaluating the production capabilities of formations intersected by the wellbore. For example, after a well or well interval has been drilled, zones of interest are often tested to determine various formation properties such as permeability, fluid type, fluid quality, formation temperature, formation pressure, bubblepoint and formation pressure gradient. These tests are performed in order to determine whether commercial exploitation of the intersected formations is viable and how to optimize production.

Formation testers have been developed to perform these tests. These testers can include a probe assembly for engaging the borehole wall and acquiring formation fluid samples. The probe assembly may include an isolation pad to engage the borehole wall. The isolation pad seals against the formation and around a hollow probe, which places an internal cavity in fluid communication with the formation. This creates a fluid pathway that allows formation fluid to flow between the formation and the formation tester while isolated from the borehole fluid. Such formation testers are most operationally efficient when a proper seal is formed between the testers and the formation wall. However, often times, a seal is not properly formed between the testers and the formation wall.

BRIEF DESCRIPTION OF THE DRAWINGS

Illustrative examples and aspects of the present application are described in detail below with reference to the following figures.

DETAILED DESCRIPTION

Figure 1A:
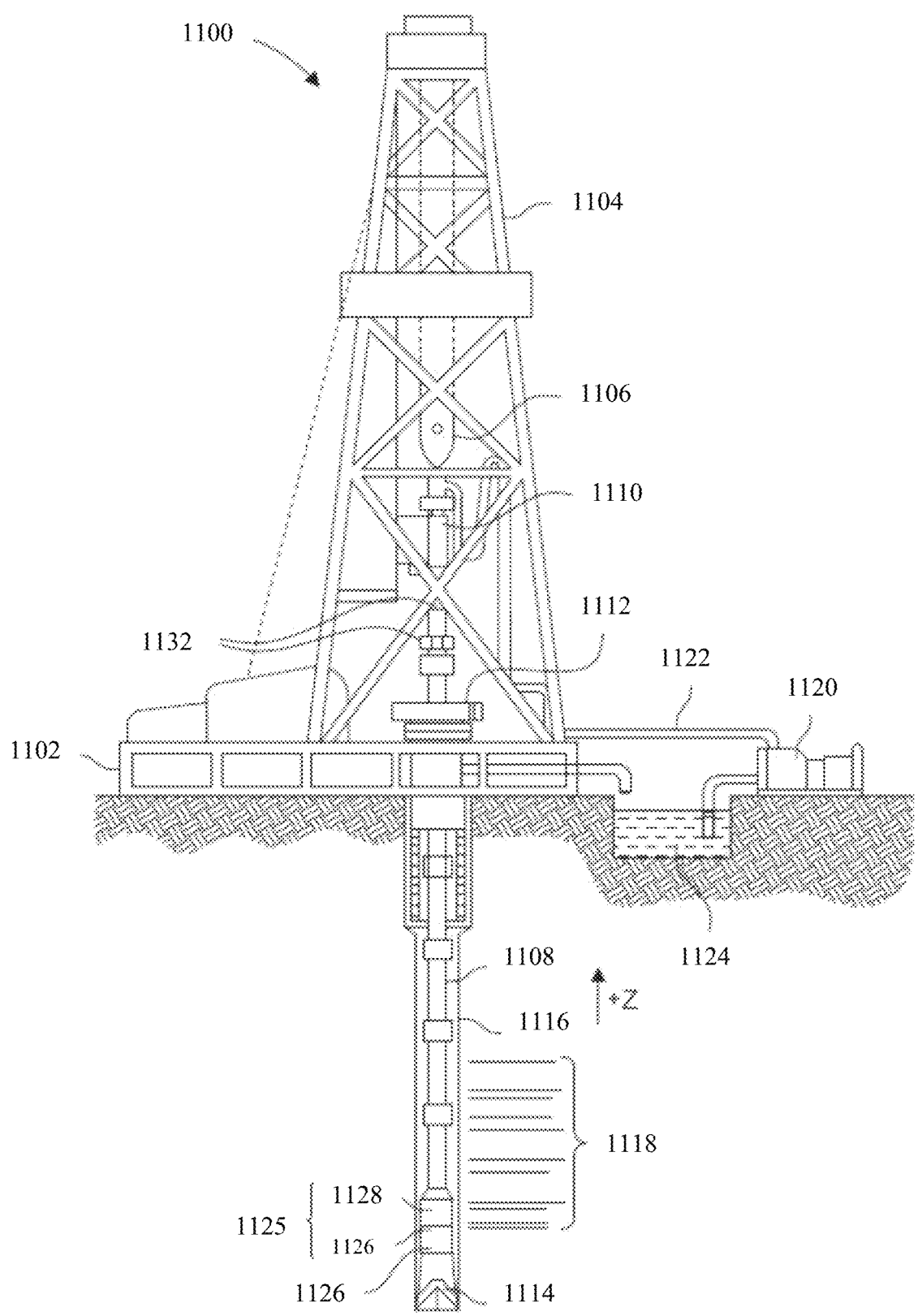
FIG. 1A is a schematic side-view of an example wireline logging environment, according to some examples of the present disclosure.

Various aspects and examples of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one embodiment or an embodiment, one aspect or an aspect, or one example or an example in the present disclosure can refer to the same embodiment/example/aspect/etc., or any embodiment/example/aspect/etc., and such references mean at least one of the embodiments, examples, and/or aspects.

Moreover, reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Also, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, techniques, systems, apparatuses, methods (also referred to as processes herein), non-transitory computer-readable media, and their related results according to the examples and aspects of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Systems, apparatuses, processes (also referred to as methods), and computer-readable media (collectively referred to herein as "systems and techniques") are described herein for determining the effectiveness of a seal between a packer in association with a pressure probe of a formation tester and a surrounding formation.

As discussed previously, during the drilling and completion of oil and gas wells, it may be necessary to engage in ancillary operations, such as monitoring the operability of equipment used during the drilling process or evaluating the production capabilities of formations intersected by the wellbore. For example, after a well or well interval has been drilled, zones of interest are often tested to determine various formation properties such as permeability, fluid type, fluid quality, formation temperature, formation pressure, bubblepoint and formation pressure gradient. These tests are performed in order to determine whether commercial exploitation of the intersected formations is viable and how to optimize production.

Wireline formation testers (WFT) and drill stem testing (DST) have been commonly used to perform these tests. The basic DST test tool consists of a packer or packers, valves or ports that may be opened and closed from the surface, and two or more pressure-recording devices. The tool is lowered on a work string to the zone to be tested. The packer or packers are set, and drilling fluid is evacuated to isolate the zone from the drilling fluid column. The valves or ports are then opened to allow flow from the formation to the tool for testing while the recorders chart static pressures. A sampling chamber traps clean formation fluids at the end of the test. WFTs generally employ the same testing techniques but use a wireline to lower the test tool into the well bore after the drill string has been retrieved from the well bore, although WFT technology is sometimes deployed on a pipe string. The wireline tool typically uses packers also, although the packers are placed closer together, compared to drill pipe conveyed testers, for more efficient formation testing. In some cases, packers are not used. In those instances, the testing tool is brought into contact with the intersected formation and testing is done without zonal isolation across the axial span of the circumference of the borehole wall.

WFTs may also include a probe assembly for engaging the borehole wall and acquiring formation fluid samples. The probe assembly may include an isolation pad to engage the borehole wall. The isolation pad, otherwise referred to as a packer, seals against the formation and around a hollow probe, which places an internal cavity in fluid communication with the formation. This creates a fluid pathway that allows formation fluid to flow between the formation and the formation tester while isolated from the borehole fluid.

In order to acquire a useful sample, the probe must stay isolated from the relative high pressure of the borehole fluid. Therefore, the integrity of the seal that is formed by the isolation pad is critical to the performance of the tool. If the borehole fluid is allowed to leak into the collected formation fluids, a non-representative sample will be obtained and the test will have to be repeated.

Isolation pads that are used with WFTs are typically rubber pads affixed to the end of the extending sample probe. The rubber is normally affixed to a metallic plate that provides support to the rubber as well as a connection to the probe. These rubber pads are often molded to fit within the specific diameter hole in which they will be operating.

With the use of WFTs and DSTs, the drill string with the drill bit must be retracted from the borehole. Then, a separate work string containing the testing equipment, or, with WFTs, the wireline tool string, must be lowered into the well to conduct secondary operations. Interrupting the drilling process to perform formation testing can add significant amounts of time to a drilling program.

DSTs and WFTs may also cause tool sticking or formation damage. There may also be difficulties of running WFTs in highly deviated and extended reach wells. WFTs also do not have flowbores for the flow of drilling mud, nor are they designed to withstand drilling loads such as torque and weight on bit.

Another testing apparatus is the formation tester while drilling (FTWD) tool. Typical FTWD formation testing equipment is suitable for integration with a drill string during drilling operations. Various devices or systems are used for isolating a formation from the remainder of the borehole, drawing fluid from the formation, and measuring physical properties of the fluid and the formation. For example, the FTWD may use a probe similar to a WFT that extends to the formation and a small sample chamber to draw in formation fluids through the probe to test the formation pressure. To perform a test, the drill string is stopped from rotating and the test procedure, similar to a WFT described above, is performed.

During a wellbore completion process, a pressure probe is placed into the wellbore and operates in conjunction with a seal being formed between the wellbore and a surrounding formation. The probe, in at least one example, can be a sensor that is capable of measuring pressure, e.g., a hydrostatic pressure of the wellbore and/or the surrounding formation.

To create an effective seal, the probe must be affixed to an interior wall of the wellbore in a manner that securely covers an aperture between the wellbore and the formation. In such a configuration, the probe can record separate pressure measurements for the wellbore and the formation. The pressure measurements can include measured pressures at different stages of wellbore completion, e.g., during probe setting, drawdown, and buildup.

In instances where the placement of the probe has not created an effective seal, the pressure measurements of the wellbore and the formation may be approximately equal, e.g., indicating fluidic communication between the wellbore and the formation. In instances, where the placement of the probe has created an effective seal, the pressure measurements of the wellbore and the formation may be different, e.g., indicating a lack of fluidic communication between the wellbore and the formation.

In conventional approaches, determinations regarding seal effectiveness have been made by comparing the pressure measurements of the wellbore with the formation's pressure measurements. However, in such approaches, the test can fail to accurately detect seal formation. For example, such comparative approaches may fail to detect seal formations in instances where wellbore pressure is approximately equal to formation pressure, e.g., such as in near/underbalanced drilling and high mobility formation situations.

The disclosed technology addresses the foregoing by determining the effectiveness of a seal between a pressure probe of a formation tester and a surrounding formation, e.g., by comparing pressure measurements of different phases of a formation measurement operation. The phases of the formation measurement operation can include a probe setting phase, a drawdown phase, and a buildup phase. The pressure probe can take multiple pressure measurements including measurements of the formation and/or wellbore during the phases of the formation measurement operation. In turn, such pressure measurements across at least two of the phases of the formation measurement operation can be used in determining the effectiveness of the seal.

For example, the multiple pressure measurements can include a first pressure measurement during a probe setting phase and a second pressure measurement during a phase after the probe setting phase. In one instance, the formation can contribute to second pressure measurements. In another instance, the formation does not contribute to the first pressure measurements gathered during the probe setting phase of the formation measurement operation. Both the first and second pressure measurements can yield a first pressure distribution during the probe setting phase and a second pressure distribution generated during the phase of the formation measurement operation after the probe setting phase, respectively.

A determination of an integrity of a seal between a packer of the formation tester and the formation can be made based on a comparison of the multiple pressure measurements (e.g., a first pressure measurement during a probe setting phase and a second pressure measurements during a phase after the probe setting phase). In some instances, statical parameters such as standard deviation, kurtosis, mean, median, mode, and the like can be used in determining the integrity of the seal. In at least one example, determining a difference between a standard deviation of the first pressure and a second pressure measurements can be conducted to determine the integrity of the seal. In another example, the integrity of the seal can be based on the difference between the standard deviations relative a threshold or predefined value, for example a threshold of a 1.5. By way of example, when the difference between the standard deviations is less than the threshold a seal can be indicated. In another instance, when the difference between the standard deviations is greater than the threshold a seal can be indicated. Based on the determined integrity of the seal, the formation measurement operation can be further controlled, e.g., resetting the probe or curing the seal in an applicable manner.

In some aspects, determining the effectiveness of the seal can further include filtering either or both the first pressure measurements and the second pressure measurements based on corresponding rates of change of the first pressure measurements and the second pressure measurements to generate filtered pressure measurements. It can be beneficial to filter pressure measurements of the probe(s) where the rate of change is not acute or rapid (e.g., a gradual rate of change). The generated filtered pressure measurements can include the value of the pressure measurements and frequency of the pressure value. In some examples, the generated filtered pressure measurements can be visualized to compare the pressure distribution characteristics at different stages of the wellbore completion. In one example, where a trend of the frequency of pressure value are similar in the filtered pressure measurement (e.g, either or both the first pressure measurements and the second pressure measurements) an indication of an ineffective seal can be present (e.g., fluidic communication between the wellbore and foundation).

Examples of the systems and techniques described herein are illustrated in FIG. 1A through FIG. 13 and described below.

FIG. 1A is a diagram illustrating an example logging while drilling (LWD) environment, according to some examples of the present disclosure. As shown, in this example, a drilling platform 1102 supports a derrick 1104 that has a traveling block 1106 for raising and a lowering drill string 1108. A kelly 1110 supports the drill string 1108 as it is lowered through a rotary cable 1112. A drill bit 1114 is driven by a downhole motor and/or rotation of the drill string 1108. As a drill bit 1114 of the drill string 1108 rotates, it drills a borehole 1116 that passes through one or more formations 1118. A pump 1120 circulates drilling fluid through a feed pipe 1122 to the kelly 1110 downhole through the interior of the drill string 1108 and orifices in the drill bit 1114, back to the surface via the annulus around the drill string 1108 and into a retention pit 1124. The drilling fluid transports cuttings from the borehole into pit 1124 and aids in maintaining borehole integrity.

A downhole tool 1126 can take the form of a drill collar (e.g., a thick-walled tubular that provides weight and rigidity to aid the drilling process) or any other known and/or suitable arrangement. Further, the downhole tool 1126 can include one or more logging tools such as, for example and without limitation, one or more acoustic (e.g., sonic, ultrasonic, etc.) logging tools and/or one or more other types of logging tools and/or corresponding components. The downhole tool 1126 can be integrated into a bottom-hole assembly 1125 near the drill bit 1114. As the drill bit 1114 extends the borehole through formations, the bottom-hole assembly 1125 can collect logging data and/or sensor data (e.g., NMR data and/or any other logging and/or sensor data). The downhole tool 1126 can include transmitters (e.g., monopole, dipole, quadrupole, etc.) to generate and transmit signals/waves into the borehole environment such as, for example and without limitation, acoustic signals/waves, radio frequency (RF) signals/waves, optical signals/waves, and/or any other signals/wavs. These signals/waves propagate in and along the borehole and the surrounding formation(s) and create signal responses or waveforms, which are received/recorded by one or more receivers.

For purposes of communication, a downhole telemetry sub 1128 can be included in the bottom-hole assembly 1125 to transfer measurement data to a surface receiver 1132 and receive commands from the surface (e.g., from a device at the surface such as a computer and/or a transmitter). Mud pulse telemetry is one example telemetry technique for transferring tool measurements to surface receivers and receiving commands from the surface. However, other telemetry techniques can also be used. Other, non-limiting example telemetry techniques that can be implemented can include fiber optic telemetry, electric telemetry, acoustic telemetry through the pipe, and electromagnetic (EM) telemetry, among others. In some aspects, the telemetry sub 1128 can store logging data for later retrieval at the surface when the logging assembly is recovered.

At the surface, the surface receiver 1132 can receive the uplink signal from the downhole telemetry sub 1128. The surface receiver 1132 can include, for example and without limitation, a wireless receiver, a computer (e.g., a laptop computer, a desktop computer, a tablet computer, a server computer, and/or any other type of computer), and/or any other device with data communication capabilities (e.g., wired and/or wireless). In some cases, the surface receiver 1132 can communicate the signal from the downhole telemetry sub 1128 to a data acquisition system (not shown). Such a data acquisition system can be part of the surface receiver 1132 or can be a separate device such as, for example, a computer, a storage device, etc. The surface receiver 1132 can include one or more processors, storage devices, input devices, output devices, memory devices, software, and/or the like. The surface receiver 1132 can collect, store, and/or process the data received from tool 1126 as described herein.

In some examples, the surface receiver 1132 can include a single receiver or multiple receivers. In some cases, the surface receiver 1132 can include a set of evenly spaced receivers or a set of receivers in any other arrangement. The surface receiver 1132 can include a number of receivers arranged in an array and/or evenly spaced (or spaced in any other configuration/arrangement) apart to facilitate capturing and processing response signals at specific intervals. The response signals/waves can be analyzed to determine borehole and adjacent formation properties and/or characteristics. Depending on the implementation, other logging tools may be deployed. For example, logging tools configured to measure electric, nuclear, gamma and/or magnetism levels may be used. Logging tools can also be implemented to measure other properties, events, and/or conditions such as, for example and without limitation, pressure, measure fluid viscosity, measure temperature, perform fluid identification, measure a tool orientation, and/or obtain any other measurements.

Figure 1B:
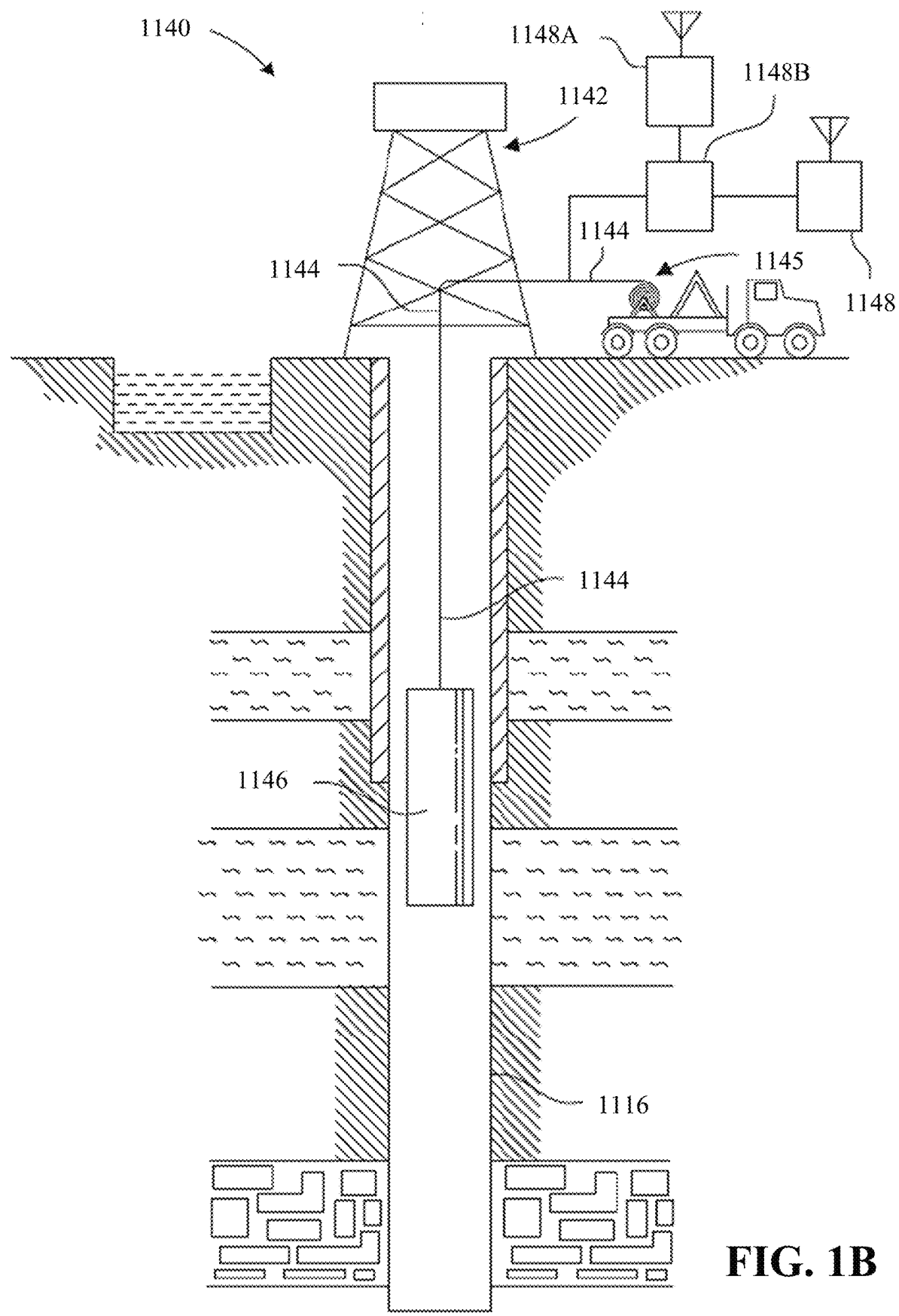
FIG. 1B is a schematic side-view of the example logging environment of FIG. 1A, according to some examples of the present disclosure.

At various times during the process of drilling a well, the drill string 1108 may be removed from the borehole 1116 as shown in FIG. 1B. Once the drill string 1108 has been removed, logging operations can be conducted using the downhole tool 1126 (e.g., a logging tool, a sensing instrument sonde, etc.) suspended by a conveyance (e.g., conveyance 1144 shown in FIG. 1B). In one or more examples, the conveyance can be or include a cable having conductors for transporting power to the tool and telemetry from the tool to the surface. In some examples, the downhole tool 1126 can have pads and/or centralizing springs to maintain the tool near the central axis of the borehole or to bias the tool towards the borehole wall as the tool is moved downhole or uphole.

In some examples, the downhole tool 1126 can include an acoustic or sonic logging instrument that collects acoustic logging data within the borehole 1116. As mentioned above, other logging instruments may additionally or alternatively be used. A logging facility can include a computer system, such as the computer system 1400 described with reference to FIG. 14, for collecting, storing, and/or processing the data/measurements gathered by the downhole tool 1126. For example, the logging facility may include a logging data management system for modifying NMR logging data to be compatible with a temperature correction algorithm determined based on laboratory generated NMR data and applying the temperature correction algorithm to the modified logging data, if needed.

In one or more examples, a conveyance of the downhole tool 1126 may include at least one of wires, conductive and/or non-conductive cable (e.g., slickline, etc.), and/or tubular conveyances such as coiled tubing, pipe string, or downhole tractor. In some cases, the downhole tool 1126 can have a local power supply, such as batteries, a downhole generator, and/or the like. When employing a non-conductive cable, coiled tubing, pipe string, or a downhole tractor, communication can be supported using, for example, wireless protocols (e.g., EM, acoustic, etc.), and/or measurements and logging data may be stored in local memory for subsequent retrieval. In some aspects, electric or optical telemetry is provided using conductive cables and/or fiber optic signal-paths.

Referring to FIG. 1B, a tool having tool body 1146 can be employed with "wireline" systems, in order to carry out logging or other operations. For example, instead of using the drill string 1108 of FIG. 1A to lower tool body 1146, which may contain sensors or other instrumentation for detecting and logging nearby characteristics and conditions of the wellbore and surrounding formation, the tool body 1146 can be lowered by a wireline conveyance 1144. Thus, as shown in FIG. 1B, the tool body 1146 can be lowered into the wellbore 1116 by the wireline conveyance 1144. The wireline conveyance 1144 can be anchored in a drill rig 1142 or portable means such as a truck. The wireline conveyance 1144 can include one or more wires, slicklines, cables, and/or the like, as well as tubular conveyances such as coiled tubing, joint tubing, or other tubulars.

The illustrated wireline conveyance 1144 can provide support for the tool (e.g., tool body 146), enable communication between the tool processors on the surface, and/or provide a power supply. The wireline conveyance 1144 can include fiber optic cabling for carrying out communications. The wireline conveyance 1144 can be sufficiently strong and flexible to tether the tool body 1146 through the wellbore 1116, while also permitting communication through the wireline conveyance 1144 to one or more local processors 1148B and/or one or more remote processors 1148A, 1148N. Power can be supplied via the wireline conveyance 1144 to meet power requirements of the tool. For slickline or coiled tubing configurations, power can be supplied downhole with a battery or via a downhole generator, for example.

Although FIGS. 1A and 1B depict specific borehole configurations, it should be understood that the present disclosure is suited for use in wellbores having other orientations including vertical wellbores, horizontal wellbores, slanted wellbores, multilateral wellbores, and the like. While FIGS. 1A and 1B depict an onshore operation, it should also be understood that the present disclosure is suited for use in offshore operations. Moreover, the present disclosure is not limited to the environments depicted in FIGS. 1A and 1B, and can also be used in other well operations such as, for example and without limitation, production tubing operations, jointed tubing operations, coiled tubing operations, combinations thereof, and/or the like.

Figure 2A:
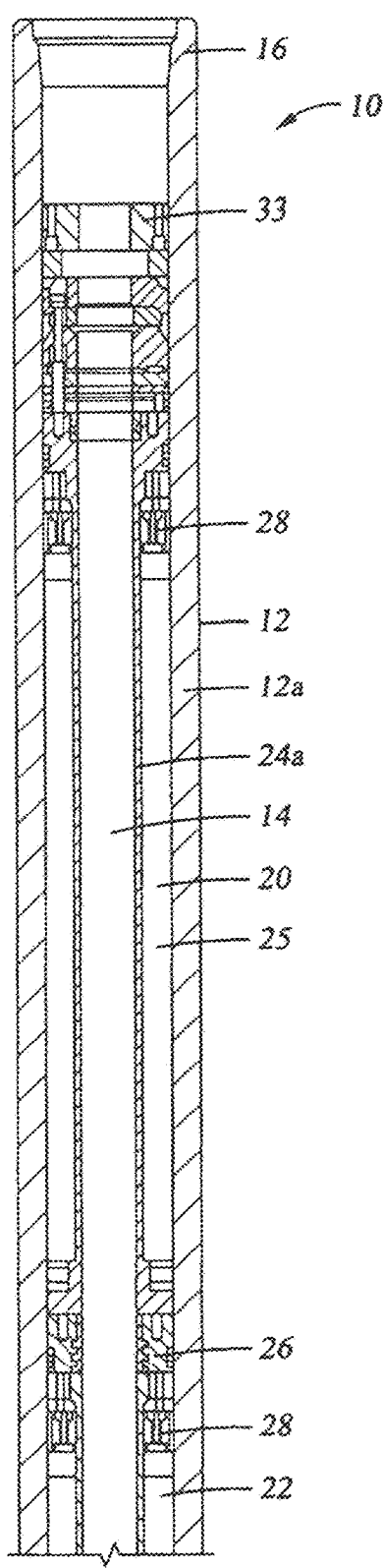
FIGS. 2A-2E are schematic elevation views, partly in cross-section, of portions of a bottomhole assembly and formation tester assembly.
Figure 2B:
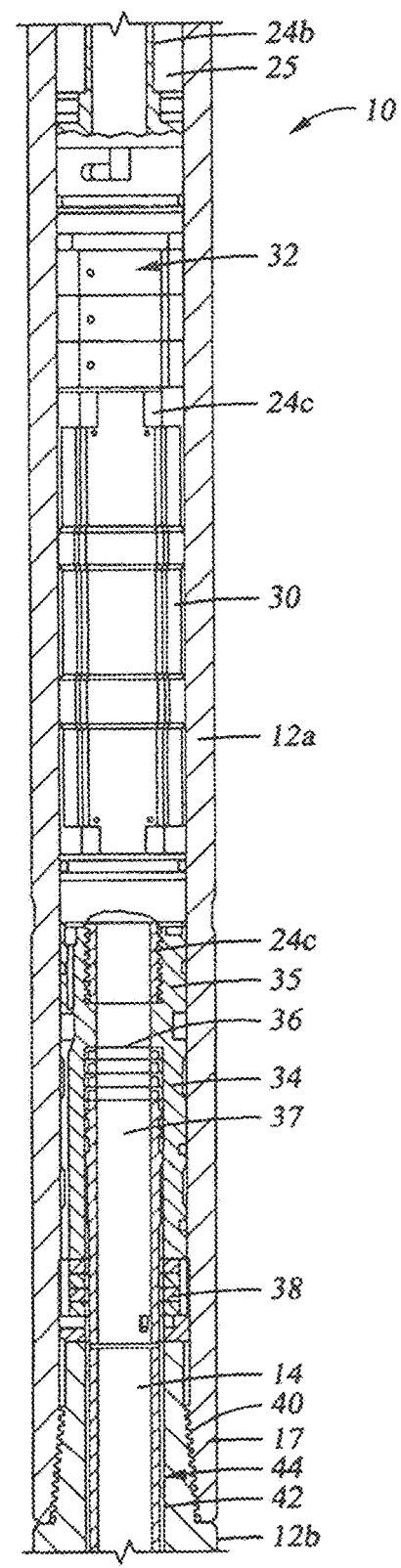

Referring to FIGS. 2A and 2B, upper section 12 *a* of housing 12 includes upper end 16 and lower end 17. Upper end 16 includes a threaded box for connecting formation tester 10 to drill string 5. Lower end 17 includes a threaded box for receiving a correspondingly threaded pin end of housing section 12 *b*. Disposed between ends 16 and 17 in housing section 12 *a* are three aligned and connected sleeves or tubular inserts 24 *a,b,c* which creates an annulus 25 between sleeves 24 *a,b,c* and the inner surface of housing section 12 *a*. Annulus 25 is sealed from flowbore 14 and provided for housing a plurality of electrical components, including battery packs 20, 22. Battery packs 20, 22 are mechanically interconnected at connector 26. Electrical connectors 28 are provided to interconnect battery packs 20, 22 to a common power bus (not shown). Beneath battery packs 20, 22 and also disposed about sleeve insert 24 *c* in annulus 25 is electronics module 30. Electronics module 30 includes the various circuit boards, capacitors banks and other electrical components, including the capacitors shown at 32. A connector 33 is provided adjacent upper end 16 in housing section 12 *a* to electrically couple the electrical components in formation tester tool 10 with other components of bottom hole assembly 6 that are above housing 12.

Beneath electronics module 30 in housing section 12 *a* is an adapter insert 34. Adapter 34 connects to sleeve insert 24 *c* at connection 35 and retains a plurality of spacer rings 36 in a central bore 37 that forms a portion of flowbore 14. Lower end 17 of housing section 12 *a* connects to housing section 12 *b* at threaded connection 40. Spacers 38 are disposed between the lower end of adapter 34 and the pin end of housing section 12 *b*. Because threaded connections such as connection 40, at various times, need to be cut and repaired, the length of sections 12 *a*, 12 *b* may vary in length. Employing spacers 36, 38 allow for adjustments to be made in the length of threaded connection 40.

Housing section 12 *b* includes an inner sleeve 44 disposed therethrough. Sleeve 44 extends into housing section 12 *a* above, and into housing section 12 *c* below. The upper end of sleeve 44 abuts spacers 36 disposed in adapter 34 in housing section 12 *a*. An annular area 42 is formed between sleeve 44 and the wall of housing 12 *b* and forms a wire way for electrical conductors that extend above and below housing section 12 *b*, including conductors controlling the operation of formation tester 10 as described below.

Figure 2C:
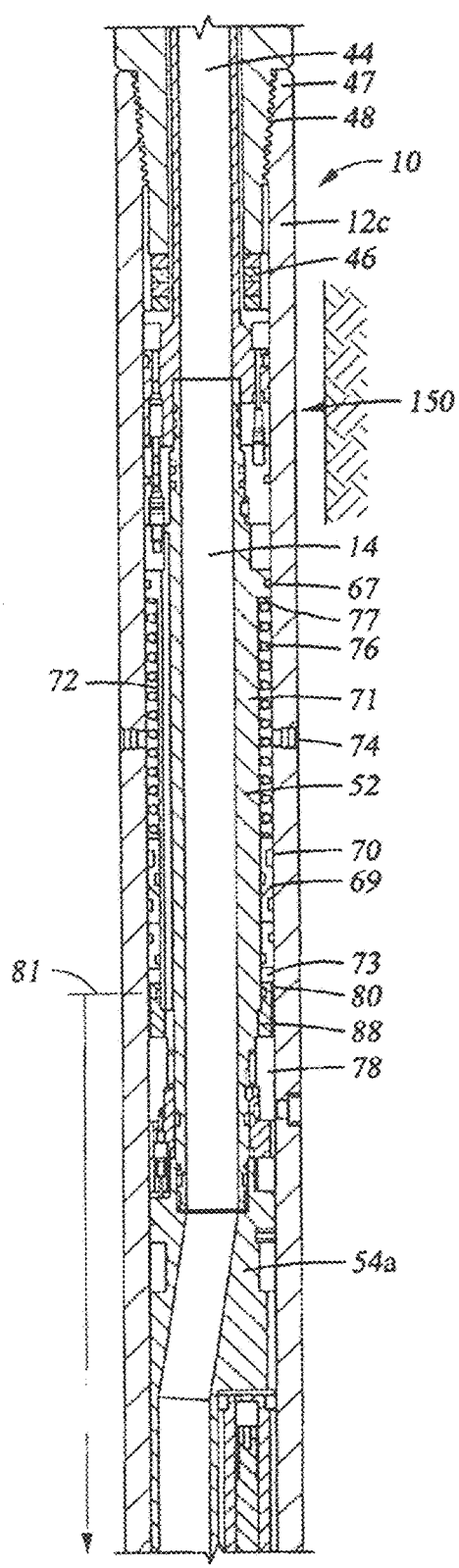

Referring now to FIGS. 2B and 2C, housing section 12 *c* includes upper box end 47 and lower box end 48 which threadingly engage housing section 12 *b* and housing section 12 *c*, respectively. For the reasons previously explained, adjusting spacers 46 are provided in housing section 12 *c* adjacent to end 47. As previously described, insert sleeve 44 extends into housing section 12 *c* where it stabs into inner mandrel 52. The lower end of inner mandrel 52 stabs into the upper end of formation tester mandrel 54, which is comprised of three axially aligned and connected sections 54 *a*, *b*, and *c*. Extending through mandrel 54 is a deviated flowbore portion 14 *a*. Deviating flowbore 14 into flowbore path 14 *a* provides sufficient space within housing section 12 *c* for the formation tool components described in more detail below. As best shown in FIG. 2E, deviated flowbore 14 *a* eventually centralizes near the lower end 48 of housing section 12 *c*, shown generally at location 56. The cross-sectional profile of deviated flowbore 14 *a* may be a non-circular in segment 14 *b*, so as to provide as much room as possible for the formation probe assembly 50 (not shown).

Figure 2D:
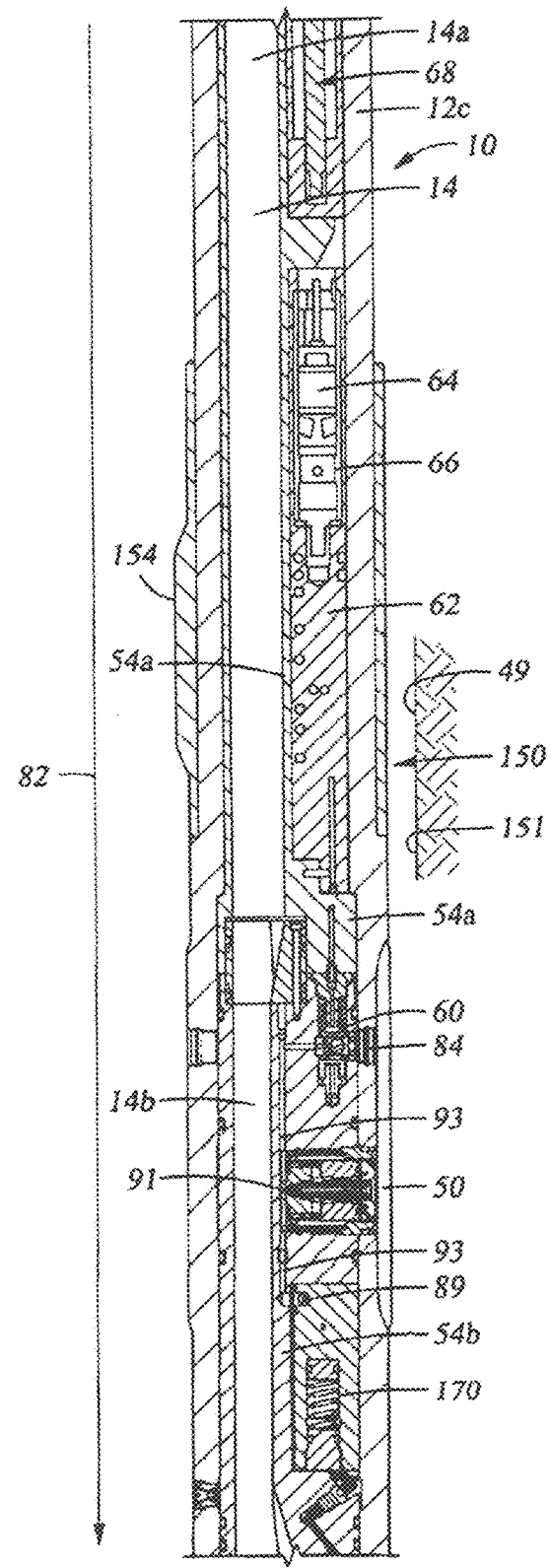
Figure 2E:
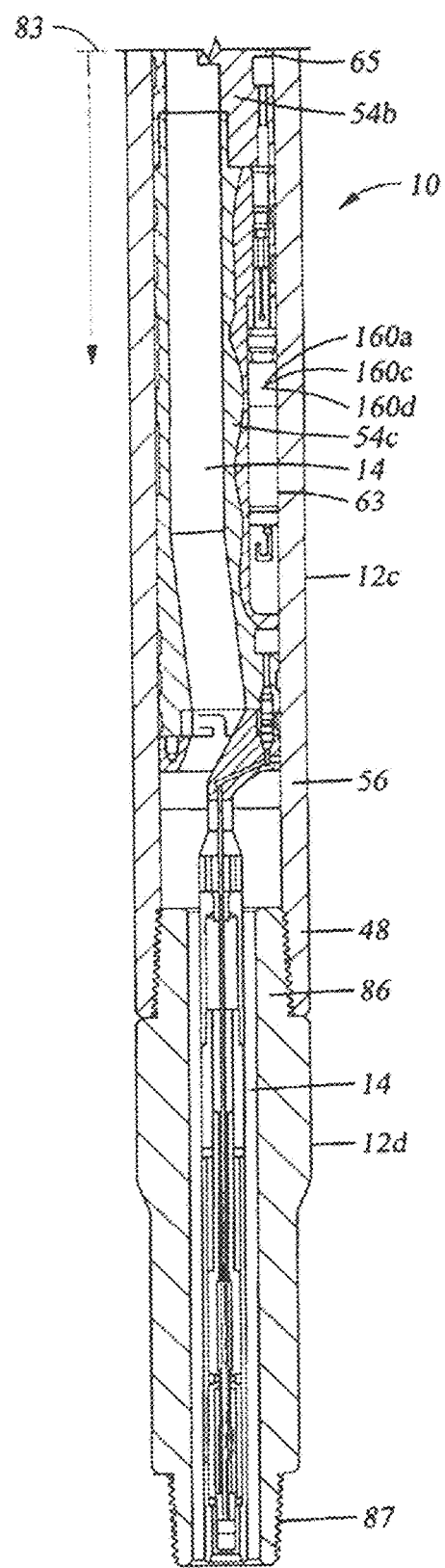

As best shown in FIGS. 2D and 2E, disposed about formation tester mandrel 54 and within housing section 12 *c* are electric motor 64, hydraulic pump 66, hydraulic manifold 62, equalizer valve 60, formation probe assembly 50, pressure transducers 160, and draw down piston 170. Hydraulic accumulators provided as part of the hydraulic system for operating formation probe assembly 50 are also disposed about mandrel 54 in various locations, one such accumulator 68 being shown in FIG. 2D.

Electric motor 64 may be a permanent magnet motor powered by battery packs 20, 22 and capacitor banks 32. Motor 64 is interconnected to and drives hydraulic pump 66. Pump 66 provides fluid pressure for actuating formation probe assembly 50. Hydraulic manifold 62 includes various solenoid valves, check valves, filters, pressure relief valves, thermal relief valves, pressure transducer 160*b* and hydraulic circuitry employed in actuating and controlling formation probe assembly 50 as explained in more detail below.

Referring again to FIG. 2C, mandrel 52 includes a central segment 71. Disposed about segment 71 of mandrel 52 are pressure balance piston 70 and spring 76. Mandrel 52 includes a spring stop extension 77 at the upper end of segment 71. Stop ring 88 is threaded to mandrel 52 and includes a piston stop shoulder 80 for engaging corresponding annular shoulder 73 formed on pressure balance piston 70. Pressure balance piston 70 further includes a sliding annular seal or barrier 69. Barrier 69 consists of a plurality of inner and outer o-ring and lip seals axially disposed along the length of piston 70.

Beneath piston 70 and extending below inner mandrel 52 is a lower oil chamber or reservoir 78, described more fully below. An upper chamber 72 is formed in the annulus between central portion 71 of mandrel 52 and the wall of housing section 12*c*, and between spring stop portion 77 and pressure balance piston 70. Spring 76 is retained within chamber 72. Chamber 72 is open through port 74 to annulus 150. As such, drilling fluids will fill chamber 72 in operation. An annular seal 67 is disposed about spring stop portion 77 to prevent drilling fluid from migrating above chamber 72.

Barrier 69 maintains a seal between the drilling fluid in chamber 72 and the hydraulic oil that fills and is contained in oil reservoir 78 beneath piston 70. Lower chamber 78 extends from barrier 69 to seal 65 located at a point generally noted as 83 and just above transducers 160 in FIG. 2E. The oil in reservoir 78 completely fills all space between housing section 12 *c* and formation tester mandrel 54. The hydraulic oil in chamber 78 may be maintained at slightly greater pressure than the hydrostatic pressure of the drilling fluid in annulus 150. The annulus pressure is applied to piston 70 via drilling fluid entering chamber 72 through port 74. Because lower oil chamber 78 is a closed system, the annulus pressure that is applied via piston 70 is applied to the entire chamber 78. Additionally, spring 76 provides a slightly greater pressure to the closed oil system 78 such that the pressure in oil chamber 78 is substantially equal to the annulus fluid pressure plus the pressure added by the spring force. This slightly greater oil pressure is desirable so as to maintain positive pressure on all the seals in oil chamber 78. Having these two pressures generally balanced (even though the oil pressure is slightly higher) is easier to maintain than if there was a large pressure differential between the hydraulic oil and the drilling fluid. Between barrier 69 in piston 70 and point 83, the hydraulic oil fills all the space between the outside diameter of mandrels 52, 54 and the inside diameter of housing section 12*c*, this region being marked as distance 82 between points 81 and 83. The oil in reservoir 78 is employed in the hydraulic circuit 200 (FIG. 9) used to operate and control formation probe assembly 50 as described in more detailed below.

Figure 3:
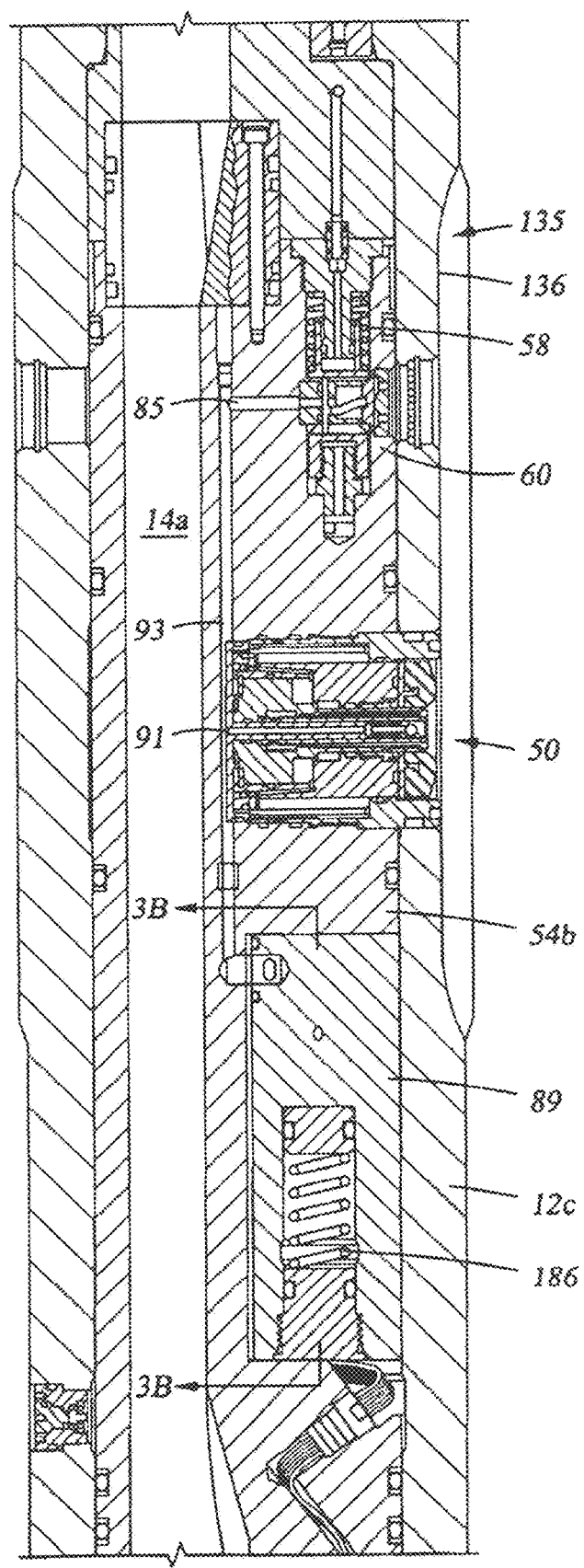
FIG. 3 is an enlarged elevation view, partly in cross-section, of the formation tester tool portion of the formation tester assembly shown in FIG. 2D.

Equalizer valve 60, best shown in FIG. 3, is disposed in formation tester mandrel 54*b* between hydraulic manifold 62 and formation probe assembly 50. Equalizer valve 60 is in fluid communication with hydraulic passageway 85 and with longitudinal fluid passageway 93 formed in mandrel 54*b*. Prior to actuating formation probe assembly 50 so as to test the formation, drilling fluid fills passageways 85 and 93 as valve 60 is normally open and communicates with annulus 150 through port 84 in the wall of housing section 12*c*. When the formation fluids are being sampled by formation probe assembly 50, valve 60 closes the passageway 85 to prevent drilling fluids from annulus 150 entering passageway 85 or passageway 93.

Figure 4:
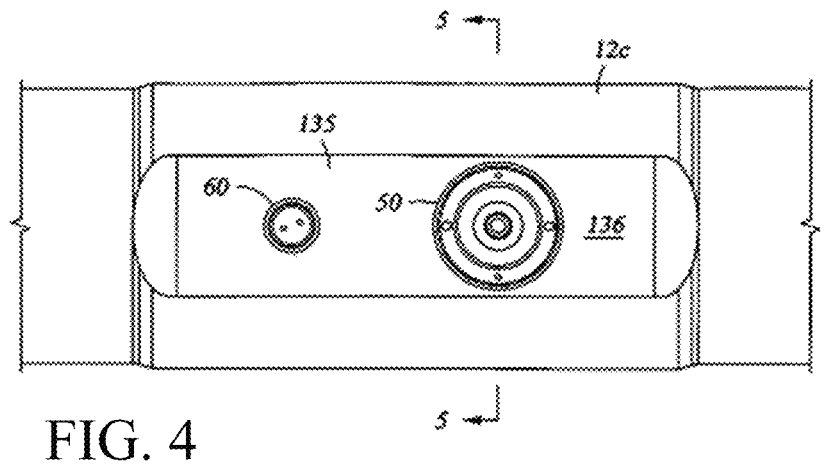
FIG. 4 is an elevation view of the formation tester tool shown in FIG. 3.
Figure 5:
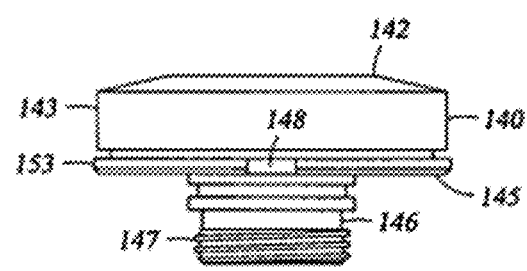
FIG. 5 is an elevation view of the probe pad mounted on the skirt employed in the formation probe assembly shown in FIG. 4.
Figure 6:
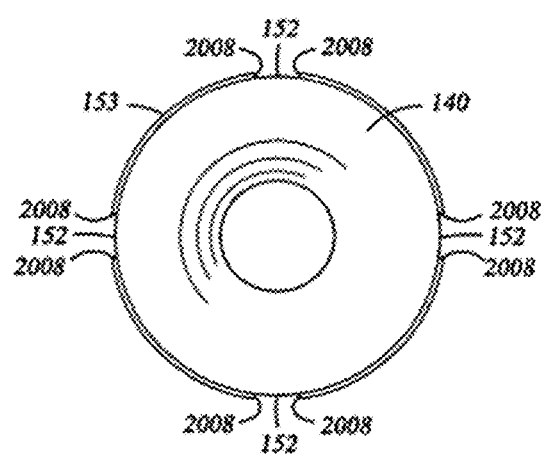
FIG. 6 is a top view of the probe pad shown in FIG. 5.

As shown in FIGS. 3 and 4, housing section 12*c* includes a recessed portion 135 adjacent to formation probe assembly 50 and equalizer valve 60. The recessed portion 135 includes a planar surface or "flat" 136. The ports through which fluids may pass into equalizing valve 60 and probe assembly 50 extend through flat 136. In this manner, as drill string 5 and formation tester 10 are rotated in the borehole, formation probe assembly 50 and equalizer valve 60 are better protected from impact, abrasion and other forces. Flat 136 is recessed at least ¼ inch and may be at least ½ inch from the outer diameter of housing section 12c. Similar flats 137, 138 are also formed about housing section 12c at generally the same axial position as flat 136 to increase flow area for drilling fluid in the annulus 150 of borehole 8.

Disposed about housing section 12c adjacent to formation probe assembly 50 is stabilizer 154. Stabilizer 154 may have an outer diameter close to that of nominal borehole size. As explained below, formation probe assembly 50 includes a seal pad 140, otherwise referred to as a packer, that is extendable to a position outside of housing 12c to engage the borehole wall 151. As explained, probe assembly 50 and seal pad 140 of formation probe assembly 50 are recessed from the outer diameter of housing section 12c, but they are otherwise exposed to the environment of annulus 150 where they could be impacted by the borehole wall 151 during drilling or during insertion or retrieval of bottom hole assembly 6. Accordingly, being positioned adjacent to formation probe assembly 50, stabilizer 154 provides additional protection to the seal pad 140 during insertion, retrieval and operation of bottom hole assembly 6. It also provides protection to pad 140 during operation of formation tester 10. In operation, a piston extends seal pad 140 to a position where it engages the borehole wall 151. The force of the pad 140 against the borehole wall 151 would tend to move the formation tester 10 in the borehole, and such movement could cause pad 140 to become damaged. However, as formation tester 10 moves sideways within the borehole as the piston is extended into engagement with the borehole wall 151, stabilizer 154 engages the borehole wall and provides a reactive force to counter the force applied to the piston by the formation. In this manner, further movement of the formation test tool 10 is resisted.

Referring to FIG. 2E, mandrel 54c contains chamber 63 for housing pressure transducers 160a, 160c, and 160d as well as electronics for driving and reading these pressure transducers. In addition, the electronics in chamber 63 contain memory, a microprocessor, and power conversion circuitry for properly utilizing power from a power bus (not shown).

Referring still to FIG. 2E, housing section 12 d includes pins ends 86, 87. Lower end 48 of housing section 12c threadedly engages upper end 86 of housing section 12 d. Beneath housing section 12d, and between formation tester tool 10 and drill bit 7 are other sections of the bottom hole assembly 6 that constitute conventional MWD tools. In a general sense, housing section 12d is an adapter used to transition from the lower end of formation tester tool 10 to the remainder of the bottom hole assembly 6. The lower end 87 of housing section 12d threadedly engages other sub assemblies included in bottom hole assembly 6 beneath formation tester tool 10. As shown, flowbore 14 extends through housing section 12d to such lower subassemblies and ultimately to drill bit 7.

Figure 3A:
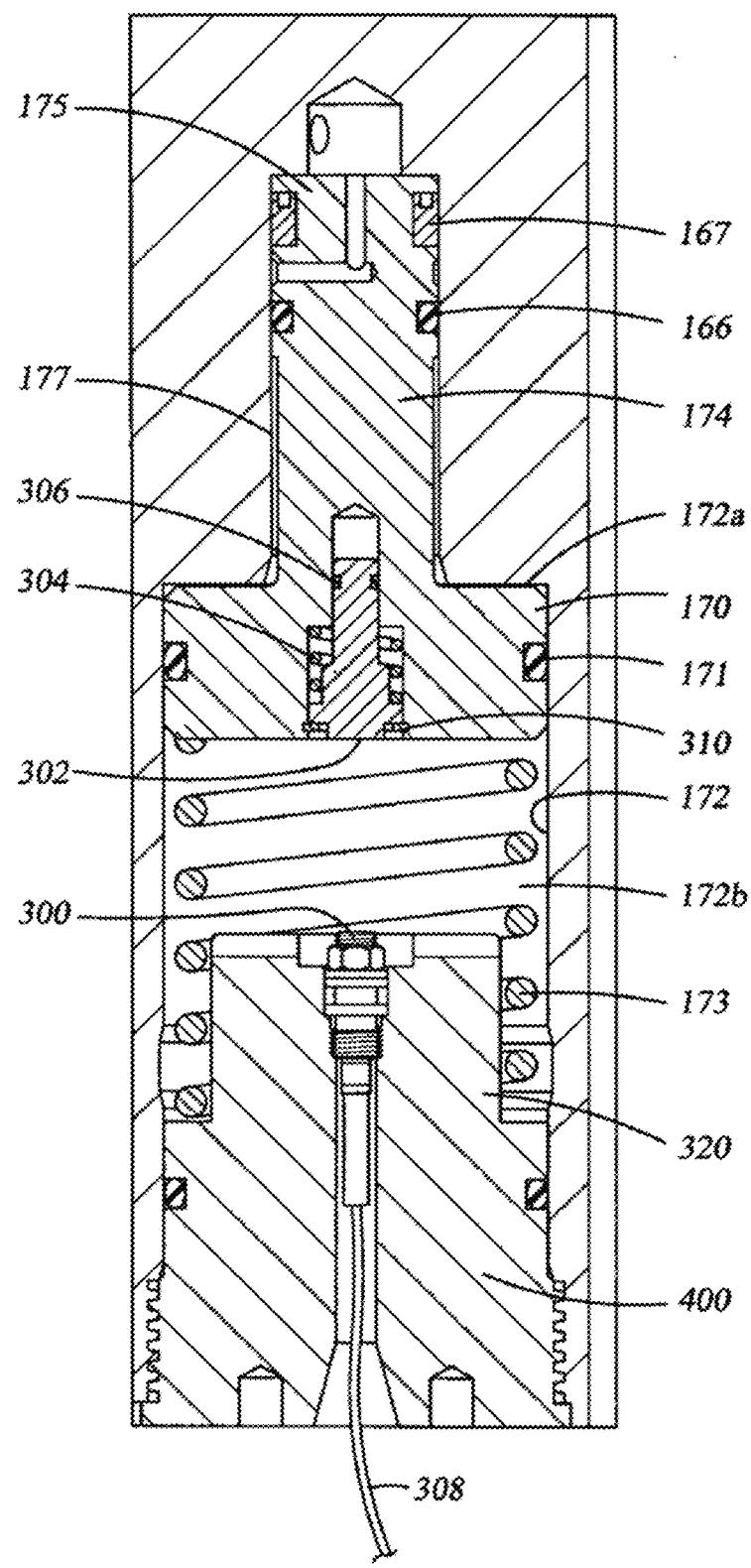
FIG. 3A is an enlarged cross-section view of the draw down piston and chamber shown in FIG. 3.
Figure 3B:
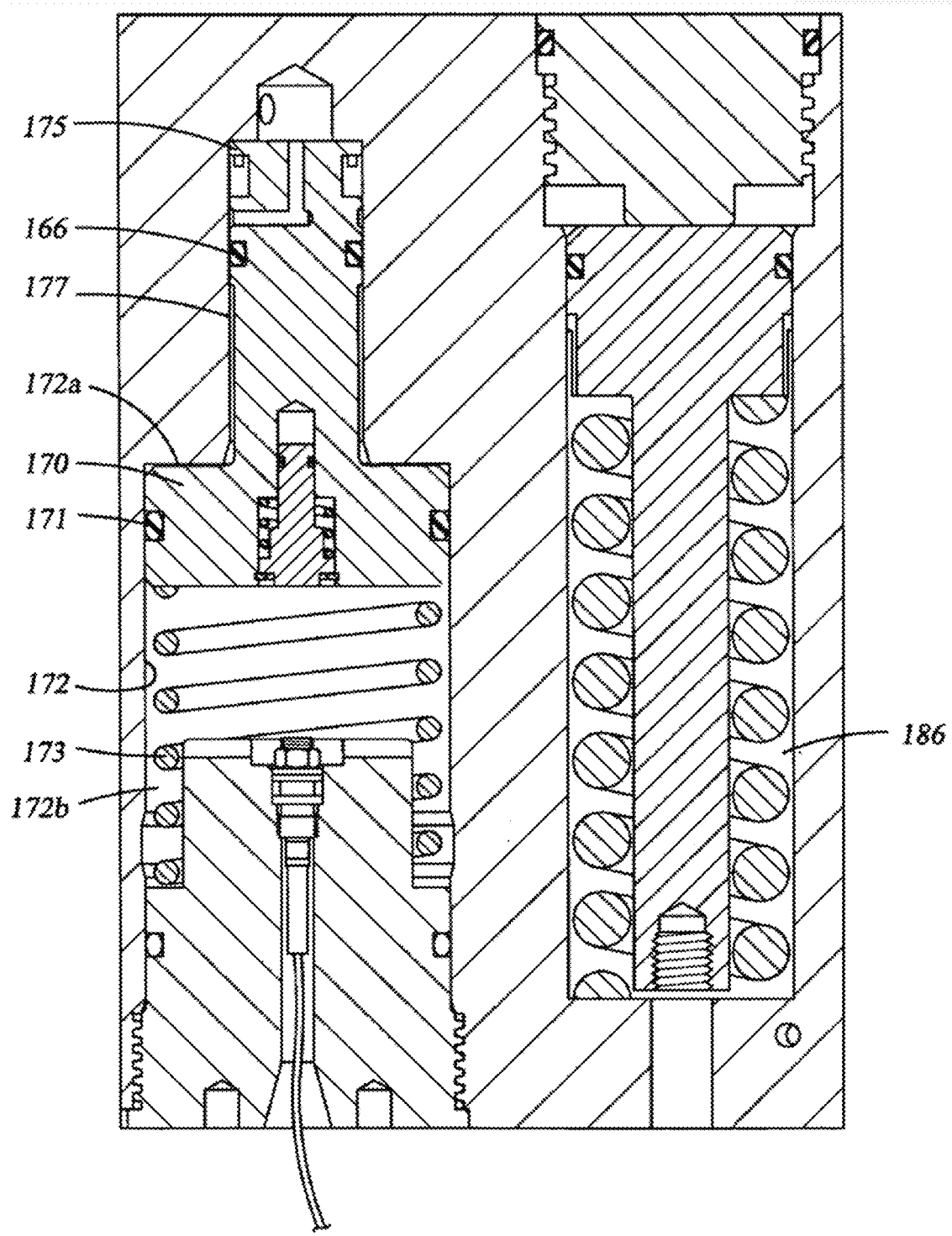
FIG. 3B is an enlarged cross-section view along line 3B-3B of FIG. 3.

Referring again to FIG. 3 and to FIG. 3A, drawdown piston 170 is retained in drawdown manifold 89 that is mounted on formation tester mandrel 54 b within housing 12c. Piston 170 includes annular seal 171 and is slidingly received in cylinder 172. Spring 173 biases piston 170 to its uppermost or shouldered position as shown in FIG. 3A. Separate hydraulic lines (not shown) interconnect with cylinder 172 above and below piston 170 in portions 172 a, 172 b to move piston 170 either up or down within cylinder 172 as described more fully below. A plunger 174 is integral with and extends from piston 170. Plunger 174 is slidingly disposed in cylinder 177 coaxial with 172. Cylinder 175 is the upper portion of cylinder 177 that is in fluid communication with the longitudinal passageway 93 as shown in FIG. 3A. Cylinder 175 is flooded with drilling fluid via its interconnection with passageway 93. Cylinder 177 is filled with hydraulic fluid beneath seal 166 via its interconnection with hydraulic circuit 200. Plunger 174 also contains scraper 167 that protects seal 166 from debris in the drilling fluid. Scraper 167 may be an o-ring energized lip seal.

Formation probe assembly 50 generally includes stem 92, a generally cylindrical adapter sleeve 94, piston 96 adapted to reciprocate within adapter sleeve 94, and a snorkel assembly 98 adapted for reciprocal movement within piston 96. Housing section 12c and formation tester mandrel 54b include aligned apertures 90a, 90b, respectively, that together form aperture 90 for receiving formation probe assembly 50.

Stem 92 includes a circular base portion 105 with an outer flange 106. Extending from base 105 is a tubular extension 107 having central passageway 108. The end of extension 107 includes internal threads at 109. Central passageway 108 is in fluid connection with fluid passageway 91 that, in turn, is in fluid communication with longitudinal fluid chamber or passageway 93, best shown in FIG. 2.

Adapter sleeve 94 includes inner end 111 that engages flange 106 of stem number 92. Adapter sleeve 94 is secured within aperture 90 by threaded engagement with mandrel 54b at segment 110. The outer end 112 of adapter sleeve 94 extends to be substantially flushed with flat 136 formed in housing member 12c. Circumferentially spaced about the outermost surface of adapter sleeve 94 is a plurality of tool engaging recesses 158. These recesses are employed to thread adapter 94 into and out of engagement with mandrel 54b. Adapter sleeve 94 includes cylindrical inner surface 113 having reduced diameter portions 114, 115. A seal 116 is disposed in surface 114. Piston 96 is slidingly retained within adapter sleeve 94 and generally includes base section 118 and an extending portion 119 that includes inner cylindrical surface 120. Piston 96 further includes central bore 121.

Snorkel 98 includes a base portion 125, a snorkel extension 126, and a central passageway 127 extending through base 125 and extension 126.

Formation tester apparatus 50 is assembled such that piston base 118 is permitted to reciprocate along surface 113 of adapter sleeve 94. Similarly, snorkel base 125 is disposed within piston 96 and snorkel extension 126 is adapted for reciprocal movement along piston surface 120. Central passageway 127 of snorkel 98 is axially aligned with tubular extension 107 of stem 92 and with screen 100.

Figure 7:
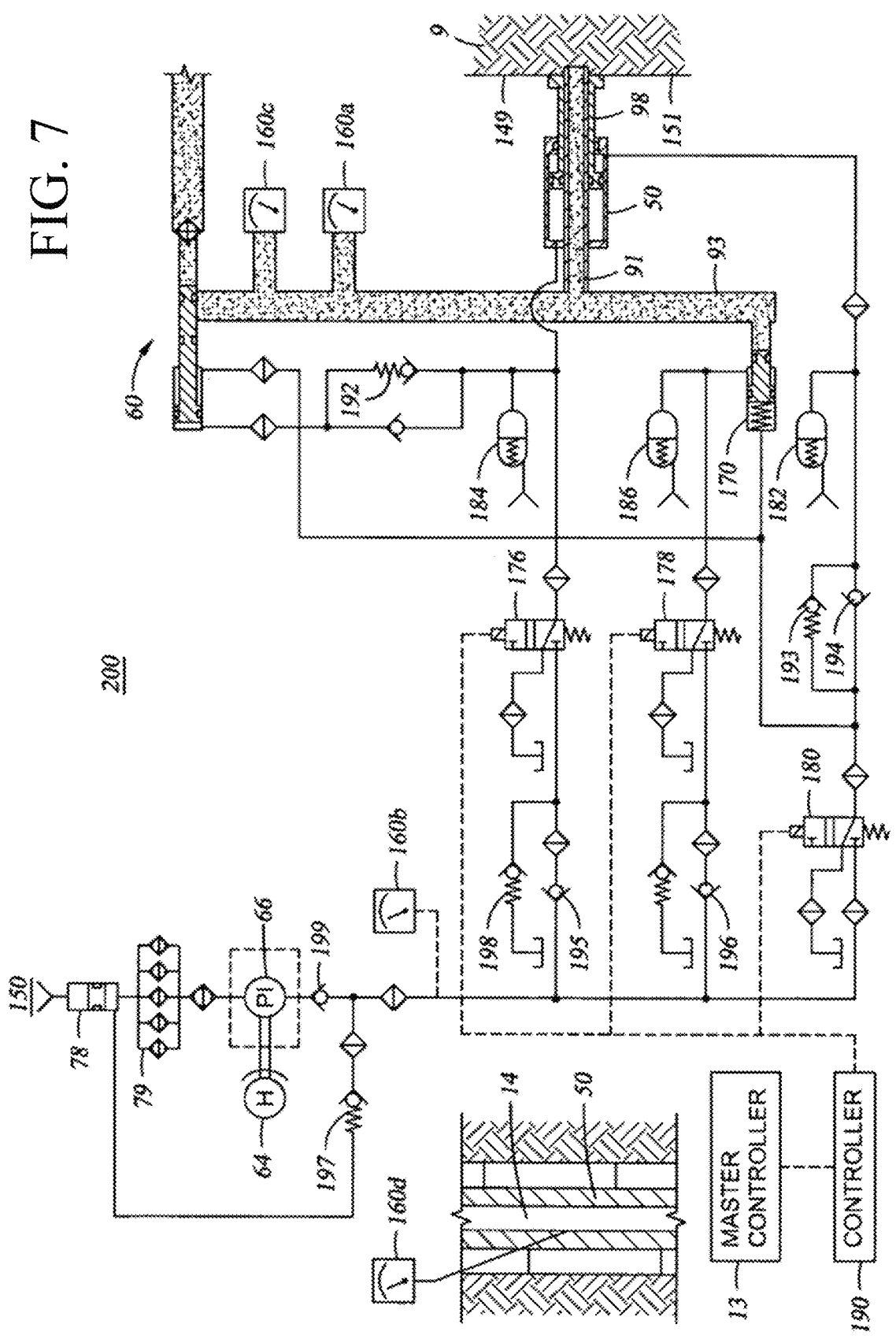
FIG. 7 is a schematic view of a hydraulic circuit employed in actuating the formation tester apparatus.

Referring to FIG. 7, with seal pad 140 sealed against the borehole wall, check valve 195 maintains the desired pressure acting against piston 96 and snorkel 98 to maintain the proper seal of pad 140. Additionally, because probe seal accumulator 184 is fully charged, should tool 10 move during drawdown, additional hydraulic fluid volume may be supplied to piston 96 and snorkel 98 to ensure that pad 140 remains tightly sealed against the borehole wall. In addition, should the borehole wall 151 move in the vicinity of pad 140, the probe seal accumulator 184 will supply additional hydraulic fluid volume to piston 96 and snorkel 98 to ensure that pad 140 remains tightly sealed against the borehole wall 151. Without accumulator 184 in circuit 200, movement of the tool 10 or borehole wall 151, and thus of formation probe assembly 50, could result in a loss of seal at pad 140 and a failure of the formation test.

With the drawdown piston 170 in its fully retracted position and formation fluid drawn into closed system 93, the pressure will stabilize and enable pressure transducers 160a and 160c to sense and measure formation fluid pressure. The measured pressure is transmitted to the controller 190 in the electronic section where the information is stored in memory and, alternatively or additionally, is communicated to the master controller in the MWD tool 13 below formation tester 10 where it may be transmitted to the surface via mud pulse telemetry or by any other conventional telemetry means.

When drawdown is completed, piston 170 actuates a contact switch 320 mounted in endcap 400 and piston 170, as shown in FIG. 3A. The drawdown switch assembly consists of contact 300, wire 308 coupled to contact 300, plunger 302, spring 304, ground spring 306, and retainer ring 310. Piston 170 actuates switch 320 by causing plunger 302 to engage contact 300 that causes wire 308 to couple to system ground via contact 300 to plunger 302 to ground spring 306 to piston 170 to endcap 400 that is in communication with system ground (not shown).

When the contact switch 320 is actuated controller 190 responds by shutting down motor 64 and pump 66 for energy conservation. Check valve 196 traps the hydraulic pressure and maintains piston 170 in its retracted position. In the event of any leakage of hydraulic fluid that might allow piston 170 to begin to move toward its original shouldered position, drawdown accumulator 186 will provide the necessary fluid volume to compensate for any such leakage and thereby maintain sufficient force to retain piston 170 in its retracted position.

During this interval, controller 190 continuously monitors the pressure in fluid passageway 93 via pressure transducers 160a and 160c until the pressure stabilizes, or after a predetermined time interval.

When the measured pressure stabilizes, or after a predetermined time interval, controller 190 de-energizes solenoid valve 176. De-energizing solenoid valve 176 removes pressure from the close side of equalizer valve 60 and from the extend side of probe piston 96. Spring 58 then returns the equalizer valve 60 to its normally open state and probe retract accumulator 182 will cause piston 96 and snorkel 98 to retract, such that seal pad 140 becomes disengaged with the borehole wall. Thereafter, controller 190 again powers motor 64 to drive pump 66 and again energizes solenoid valve 180. This step ensures that piston 96 and snorkel 98 have fully retracted and that the equalizer valve 60 is opened. Given this arrangement, the formation tool 10 has a redundant probe retract mechanism. Active retract force is provided by the pump 66. A passive retract force is supplied by probe retract accumulator 182 that is capable of retracting the probe even in the event that power is lost. Accumulator 182 may be charged at the surface before being employed downhole to provide pressure to retain the piston and snorkel in housing 12c.

Figure 8:
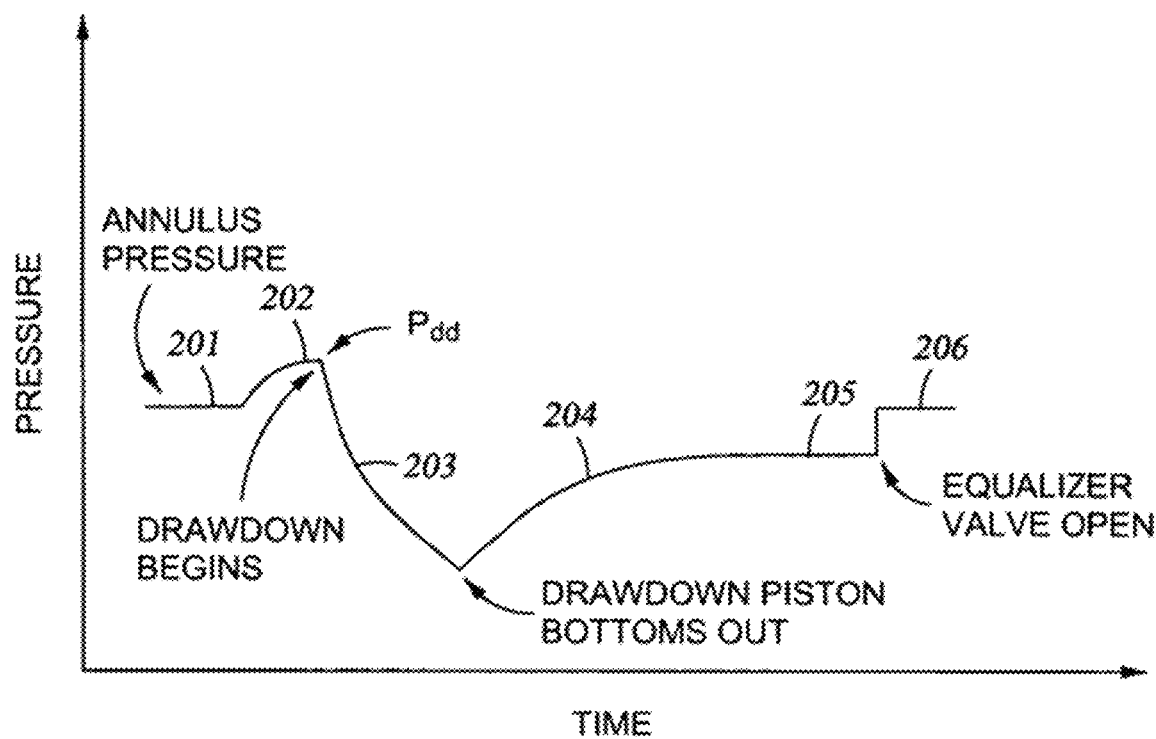
FIG. 8 is a graph of the formation fluid pressure as compared to time measured during operation of the tester apparatus.

Referring now to FIG. 8, a pressure versus time graph illustrates in a general way the pressure sensed by pressure transducers 160a, 160c during the operation of formation tester 10. As the formation fluid is drawn within the tester, pressure readings are taken continuously by transducer 160a, 160c. The sensed pressure will initially be equal to the annulus pressure shown at point 201. As pad 140 is extended and equalizer valve 60 is closed, there will be a slight increase in pressure as shown at 202. This occurs when the pad 140 seals against the borehole wall 151 and squeezes the drilling fluid trapped in the now-isolated passageway 93. As drawn down piston 170 is actuated, the volume of the closed chamber 93 increases, causing the pressure to decrease as shown in region 203. This is known as the pretest drawdown. The combination of the flow rate and snorkel inner diameter determines an effective range of operation for tester 10. When the drawn down piston bottoms out within cylinder 172, a differential pressure with the formation fluid exists causing the fluid in the formation to move towards the low pressure area and, therefore, causing the pressure to build over time as shown in region 204, commonly referred to as a build up phase. The pressure begins to stabilize, and at point 205, achieves the pressure of the formation fluid in the zone being tested. After a fixed time, such as three minutes after the end of region 203, the equalizer valve 60 is again opened, and the pressure within chamber 93 equalizes back to the annulus pressure as shown at 206.

Figure 9:
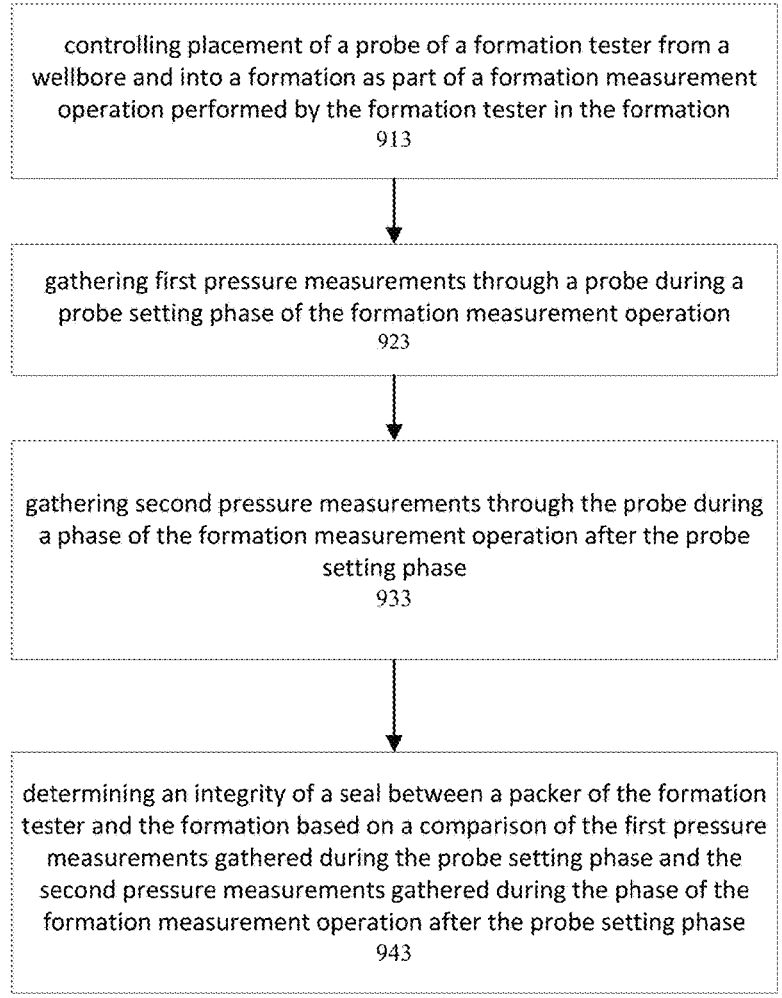
FIG. 9 is a flowchart illustrating an example procedure for identifying the effectiveness of a seal detection during formation pressure testing, according to some aspects of the present disclosure.

FIG. 9 is a flowchart illustrating an example process 900 for identifying the effectiveness of a seal between a packer of a formation tester and a formation. At block 913, the process 1200 includes controlling placement of a probe of a formation tester from a wellbore and into a formation as part of a formation measurement operation performed by the formation tester in the formation.

At block 923, the process 900 includes gathering first pressure measurements through a probe during a probe setting phase of the formation measurement operation. In at least in one example, the formation does not contribute to the first pressure measurements gathered during the probe setting phase of the formation measurement operation. In other instances, the first pressure measurements can include a first pressure distribution generated during the probe setting phase.

At block 933, the process 900 includes gathering second pressure measurements through the probe during a phase of the formation measurement operation after the probe setting phase. In some examples, the phase of the formation measurement operation after the probe setting phase can include a buildup phase. In at least one example, the formation can contribute, at least in part, to the second pressure measurements gathered during the phase of the formation measurement operation after the probe setting phase. In other instances, the second pressure measurements can include a second pressure distribution generated during the phase of the formation measurement operation after the probe setting phase.

At block 943, the process 900 includes determining an integrity of a seal between a packer of the formation tester and the formation based on a comparison of the first pressure measurements gathered during the probe setting phase and the second pressure measurements gathered during the phase of the formation measurement operation after the probe setting phase. In one instance, the integrity of the seal between the packer of the formation tester and the formation can include determining a difference between a standard deviation of the first pressure measurements gathered during the probe setting phase and a standard deviation of the second pressure measurements gathered during the phase of the formation measurement operation after the probe setting phase relative to a threshold and determining the integrity of the seal based on the difference between the standard deviations relative to the threshold.

The process 900, in at least one aspect, can further include determining whether the difference between the standard deviations is less than or greater than the threshold, and determining that the seal is compromised between the packer and the formation if the difference between the standard deviations is less than the threshold. In other aspects, the process 900 can include determining that the seal is formed between the packer and the formation if the difference between the standard deviations is greater than the threshold. Controlling the formation measurement operation based on the determined integrity of the seal can further be included in the process 900.

Figure 10A:
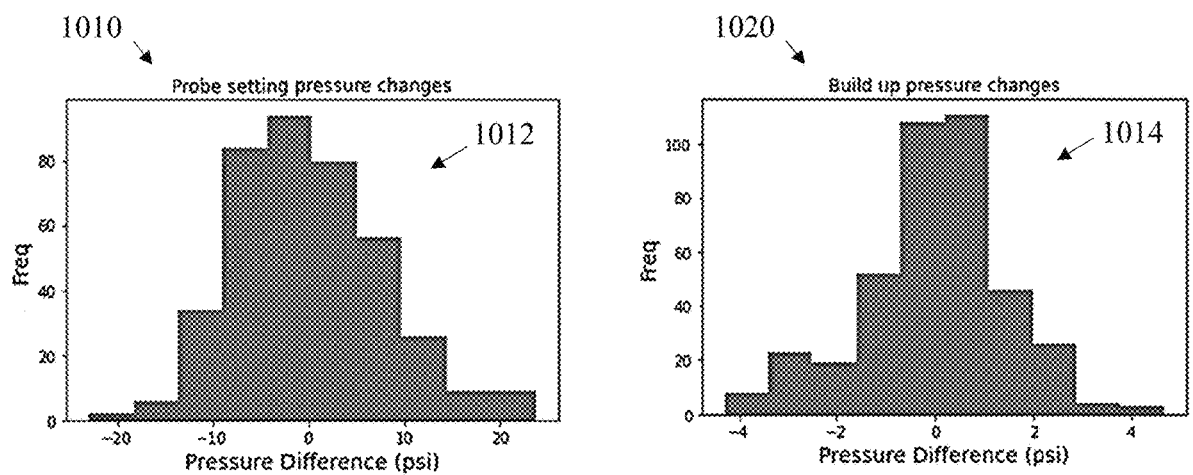
FIG. 10A is an example graph of a distribution of pressure difference where the probe is sealed.
Figure 10B:
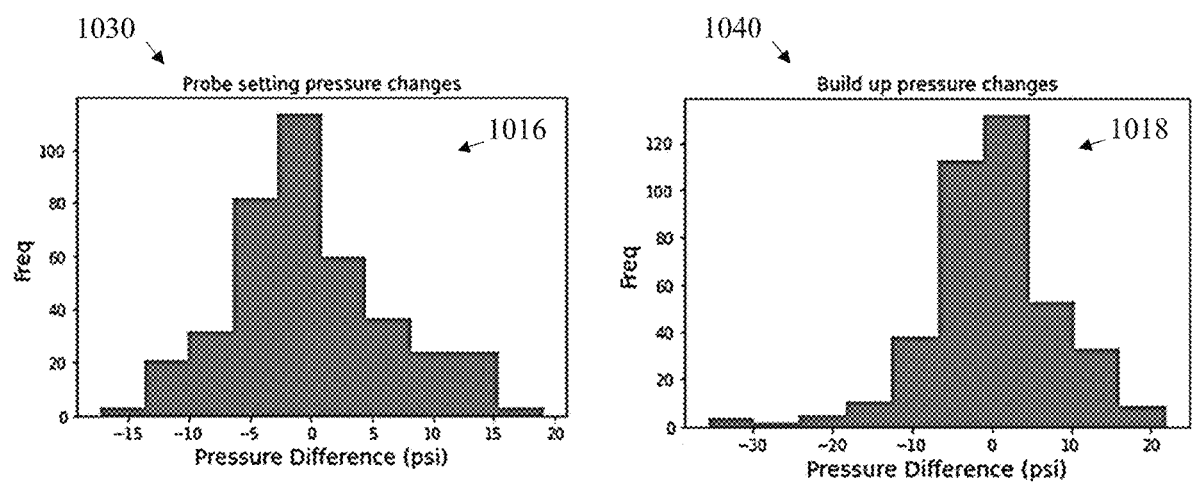
FIG. 10B is an example graph of a distribution of pressure difference where the probe is not sealed.

Now referring to FIGS. 10A and 10B, FIG. 10A illustrates an example visualization of a first pressure measurement during a probe setting phase 1010 and a second pressure measurement during a phase after the probe setting phase 1020 (e.g., build up phase). However, the following disclosure is not limited to the requirement of visualizing probe data and be implemented by a process-based system and/or computing system 1000. Frequency of the measured pressures can be recorded on the vertical axis of the plots 1010, 1020, 1030, and 1040. Pressure differences from a mean pressure value can be displayed on the horizontal axis of the plots 1010, 1020, 1030, and 1040.

Where the trend/pattern of the frequency and pressure difference of the probe setting phase 1012 and build up 1014 differ from the first pressure measurement during a probe setting phase 1010 and second pressure measurement during a phase after the probe setting phase 1020, an indication of an effective seal is present. Where the trend/pattern of the frequency and pressure difference of the probe setting phase 1016 and build up 1018 differ from the first pressure measurement during a probe setting phase 1030 and second pressure measurement during a phase after the probe setting phase 1040, an indication of an ineffective seal is present.

Figure 11:
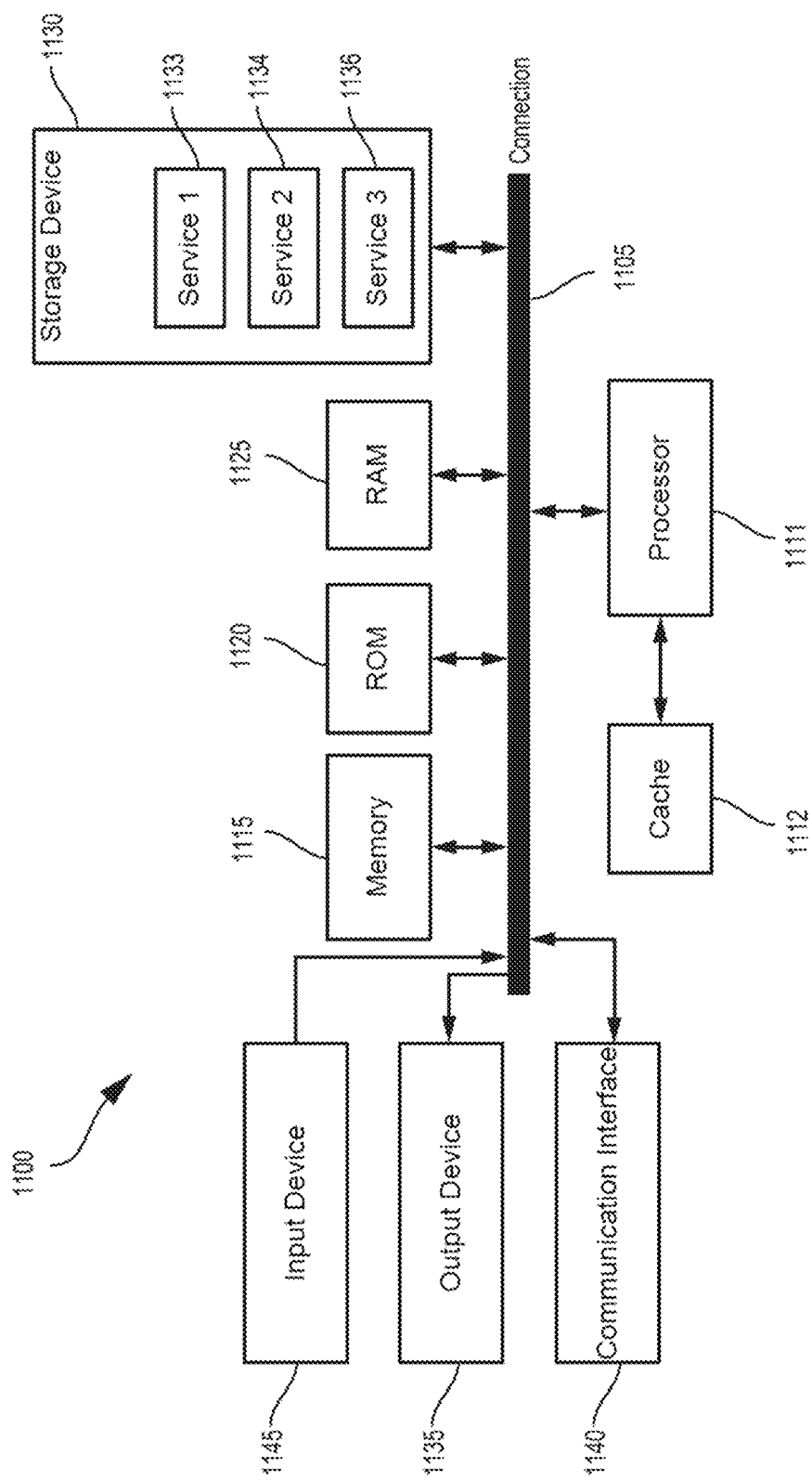
FIG. 11 illustrates an example computing device and hardware that can be used to implement some aspects of the disclosed technology.

FIG. 11 illustrates an example processor-based system 1100 with which some aspects of the subject technology can be implemented. Connection 1105 can be a physical connection via a bus, or a direct connection into processor 1111, such as in a chipset architecture. Connection 1105 can also be a virtual connection, networked connection, or logical connection.

In some examples, computing system 1100 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 1100 includes at least one processing unit (CPU or processor) 1111 and connection 1105 that couples various system components including system memory 1415, such as read-only memory (ROM) 1120 and random-access memory (RAM) 1125 to processor 1110. Computing system 1100 can include a cache of high-speed memory 1115 connected directly with, in close proximity to, and/or integrated as part of processor 1111.

Processor 1111 can include any general-purpose processor and a hardware service or software service, such as services 1133, 1134, and 1136 stored in storage device 1130, configured to control processor 1111 as well as a special-purpose processor where software instructions are incorporated into the actual processor design. Processor 1111 may essentially be a completely self-contained computing system, containing multiple cores or processors, a bus, memory controller, cache, etc. A multi-core processor may be symmetric or asymmetric.

To enable user interaction, computing system 1100 can include an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms known to those of skill in the art. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 1130 can include software services, servers, services, etc., that when the code that defines such software is executed by the processor 1111, causes the system to perform a function. In some examples, a hardware service that performs a particular function can include the software component stored in a computer-readable medium in connection with the necessary hardware components, such as processor 1111, connection 1105, output device 1135, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

SELECTED EXAMPLES

Illustrative examples of the disclosure include:

Aspect 1. A computer-implemented method comprising: controlling placement of a probe of a formation tester from a wellbore and into a formation as part of a formation measurement operation performed by the formation tester in the formation; gathering first pressure measurements through a probe during a probe setting phase of the formation measurement operation; gathering second pressure measurements through the probe during a phase of the formation measurement operation after the probe setting phase; and determining an integrity of a seal between a packer of the formation tester and the formation based on a comparison of the first pressure measurements gathered during the probe setting phase and the second pressure measurements gathered during the phase of the formation measurement operation after the probe setting phase.

Aspect 2. The computer-implemented method of Aspect 1, wherein the phase of the formation measurement operation after the probe setting phase comprises a buildup phase.

Aspect 3. The computer-implemented method of any of Aspects 1 and 2, wherein determining the integrity of the seal between the packer of the formation tester and the formation further comprises: determining a difference between a standard deviation of the first pressure measurements gathered during the probe setting phase and a standard deviation of the second pressure measurements gathered during the phase of the formation measurement operation after the probe setting phase relative to a threshold; and determining the integrity of the seal based on the difference between the standard deviations relative to the threshold.

Aspect 4. The computer-implemented method of any of Aspects 1 through 3, further comprising: determining whether the difference between the standard deviations is less than or greater than the threshold; and determining that the seal is compromised between the packer and the formation if the difference between the standard deviations is less than the threshold.

Aspect 5. The computer-implemented method of any of Aspects 1 through 4, further comprising determining that the seal is formed between the packer and the formation if the difference between the standard deviations is greater than the threshold.

Aspect 6. The computer-implemented method of any of Aspects 1 through 5, further comprising controlling the formation measurement operation based on the determined integrity of the seal.

Aspect 7. The computer-implemented method of any of Aspects 1 through 6, wherein the formation contributes, at least in part, to the second pressure measurements gathered during the phase of the formation measurement operation after the probe setting phase.

Aspect 8. The computer-implemented method of any of Aspects 1 through 7, wherein the formation does not contribute to the first pressure measurements gathered during the probe setting phase of the formation measurement operation.

Aspect 9. The computer-implemented method of any of Aspects 1 through 8, wherein the first pressure measurements include a first pressure distribution generated during the probe setting phase and the second pressure measurements include a second pressure distribution generated during the phase of the formation measurement operation after the probe setting phase.

Aspect 10. The computer-implemented method of any of Aspects 1 through 9, filtering either or both the first pressure measurements and the second pressure measurements based on corresponding rates of change of the first pressure measurements and the second pressure measurements to generate filtered pressure measurements; and determining the integrity of the seal between the packer and the formation based on the filtered pressure measurements.

Aspect 11. A system comprising: a formation tester disposed in a wellbore in a formation; one or more processors; and at least one computer-readable storage medium having stored therein instructions which, when executed by the one or more processors, cause the one or more processors to: control placement of a probe of the formation tester from the wellbore and into the formation as part of a formation measurement operation performed by the formation tester in the formation; gather first pressure measurements through a probe during a probe setting phase of the formation measurement operation; gather second pressure measurements through the probe during a phase of the formation measurement operation after the probe setting phase; and determine an integrity of a seal between a packer of the formation tester and the formation based on a comparison of the first pressure measurements gathered during the probe setting phase and the second pressure measurements gathered during the phase of the formation measurement operation after the probe setting phase.

Aspect 12. The system of Aspect 11, wherein the phase of the formation measurement operation after the probe setting phase comprises a buildup phase.

Aspect 13. The system of any of Aspects 11 and 12, wherein determining the integrity of the seal between the packer of the formation tester and the formation further comprises: determining a difference between a standard deviation of the first pressure measurements gathered during the probe setting phase and a standard deviation of the second pressure measurements gathered during the phase of the formation measurement operation after the probe setting phase relative to a threshold; and determining the integrity of the seal based on the difference between the standard deviations relative to the threshold.

Aspect 14. The system of any of Aspects 11 through 13, determining whether the difference between the standard deviations is less than or greater than the threshold; and determining that the seal is compromised between the packer and the formation if the difference between the standard deviations is less than the threshold.

Aspect 15. The system of any of Aspects 11 through 14, further comprising determining that the seal is formed between the packer and the formation if the difference between the standard deviations is greater than the threshold.

Aspect 16. The system of any of Aspects 11 through 15, further comprising controlling the formation measurement operation based on the determined integrity of the seal.

Aspect 17. The system of any of Aspects 11 through 16, wherein the formation does not contribute to the first pressure measurements gathered during the probe setting phase of the formation measurement operation.

Aspect 18. The system of any of Aspects 11 through 17, wherein the first pressure measurements include a first pressure distribution generated during the probe setting phase and the second pressure measurements include a second pressure distribution generated during the phase of the formation measurement operation after the probe setting phase.

Aspect 19. The system of any of Aspects 11 through 18, filtering either or both the first pressure measurements and the second pressure measurements based on corresponding rates of change of the first pressure measurements and the second pressure measurements to generate filtered pressure measurements; and determining the integrity of the seal between the packer and the formation based on the filtered pressure measurements.

Aspect 20. A non-transitory computer-readable storage medium having stored therein instructions which, when executed by one or more processors, cause the one or more processors to: control placement of a probe of a formation tester from a wellbore and into a formation as part of a formation measurement operation performed by the formation tester in the formation; gather first pressure measurements through a probe during a probe setting phase of the formation measurement operation; gather second pressure measurements through the probe during a phase of the formation measurement operation after the probe setting phase; and determine an integrity of a seal between a packer of the formation tester and the formation based on a comparison of the first pressure measurements gathered during the probe setting phase and the second pressure measurements gathered during the phase of the formation measurement operation after the probe setting phase.

Aspect 21. A system comprising means for performing a method according to any of Aspects 1 through 10.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A computer-implemented method comprising:
controlling placement of a probe of a formation tester from a wellbore and into a formation as part of a formation measurement operation performed by the formation tester in the formation;
gathering first pressure measurements through a probe during a probe setting phase of the formation measurement operation that occurs before a second phase of the formation measurement operation;
gathering second pressure measurements through the probe during the second phase of the formation measurement operation that occurs after the probe setting phase;
determining a difference between a standard deviation of the first pressure measurements gathered during the probe setting phase and a standard deviation of the second pressure measurements gathered during the second phase of the formation measurement operation relative to a threshold; and
determining an integrity of a seal between a packer of the formation tester and the formation based on:
a comparison of the first pressure measurements gathered through the probe during the probe setting phase and the second pressure measurements gathered through the probe during the second phase of the formation measurement operation and
the difference between the standard deviations relative to the threshold.

2. The computer-implemented method of claim 1, wherein the second phase of the formation measurement operation comprises a buildup phase.

3. The computer-implemented method of claim 1, further comprising:
determining whether the difference between the standard deviations is less than or greater than the threshold; and
determining that the seal is compromised between the packer and the formation when the difference between the standard deviations is less than the threshold.

4. The computer-implemented method of claim 3, further comprising determining that the seal is formed between the packer and the formation when the difference between the standard deviations is greater than the threshold.

5. The computer-implemented method of claim 1, further comprising controlling the formation measurement operation based on the determined integrity of the seal, wherein:
phases of the of the formation measurement operation include the probe setting phase, a drawdown phase, and a buildup phase, and
the second phase of the formation measurement operation comprises one of the drawdown phase or the buildup phase.

6. The computer-implemented method of claim 1, wherein the formation contributes, at least in part, to the second pressure measurements gathered during the second phase of the formation measurement operation.

7. The computer-implemented method of claim 6, wherein the formation does not contribute to the first pressure measurements gathered during the probe setting phase of the formation measurement operation.

8. The computer-implemented method of claim 1, wherein the first pressure measurements include a first pressure distribution generated during the probe setting phase and the second pressure measurements include a second pressure distribution generated during the second phase of the formation measurement operation.

9. The computer-implemented method of claim 1, further comprising:
filtering either or both the first pressure measurements and the second pressure measurements based on corresponding rates of change of the first pressure measurements and the second pressure measurements to generate filtered pressure measurements; and
determining the integrity of the seal between the packer and the formation based on the filtered pressure measurements.

10. A system comprising:
a formation tester disposed in a wellbore in a formation;
one or more processors; and
at least one computer-readable storage medium having stored therein instructions which, when executed by the one or more processors, cause the one or more processors to:
control placement of a probe of the formation tester from the wellbore and into the formation as part of a formation measurement operation performed by the formation tester in the formation;
gather first pressure measurements through a probe during a probe setting phase of the formation measurement operation that occurs before a second phase of the formation measurement operation;
gather second pressure measurements through the probe during the second phase of the formation measurement operation that occurs after the probe setting phase;
determine a difference between a standard deviation of the first pressure measurements gathered during the probe setting phase and a standard deviation of the second pressure measurements gathered during the second phase of the formation measurement operation relative to a threshold; and
determine an integrity of a seal between a packer of the formation tester and the formation based on:
a comparison of the first pressure measurements gathered through the probe during the probe setting phase and the second pressure measurements gathered through the probe during the second phase of the formation measurement operation, and
the difference between the standard deviations relative to the threshold.

11. The system of claim 10, wherein the second phase of the formation measurement operation comprises a buildup phase.

12. The system of claim 10, wherein the one or more processors execute the instructions to:
determine whether the difference between the standard deviations is less than or greater than the threshold; and
determine that the seal is compromised between the packer and the formation when the difference between the standard deviations is less than the threshold.

13. The system of claim 12, wherein the one or more processors execute the instructions to determine that the seal is formed between the packer and the formation when the difference between the standard deviations is greater than the threshold.

14. The system of claim 10, wherein:
the one or more processors execute the instructions to control the formation measurement operation based on the determined integrity of the seal,
phases of the of the formation measurement operation include the probe setting phase, a drawdown phase, and a buildup phase, and
the second phase of the formation measurement operation comprises one of the drawdown phase or the buildup phase.

15. The system of claim 10, wherein the formation does not contribute to the first pressure measurements gathered during the probe setting phase of the formation measurement operation.

16. The system of claim 10, wherein the first pressure measurements include a first pressure distribution generated during the probe setting phase and the second pressure measurements include a second pressure distribution generated during the second phase of the formation measurement operation.

17. The system of claim 10, further comprising:
filtering either or both the first pressure measurements and the second pressure measurements based on corresponding rates of change of the first pressure measurements and the second pressure measurements to generate filtered pressure measurements; and
determining the integrity of the seal between the packer and the formation based on the filtered pressure measurements.

* * * * *